(12) United States Patent
Matthias et al.

(10) Patent No.: US 7,413,460 B2
(45) Date of Patent: Aug. 19, 2008

(54) ELECTRIC HAND-HELD POWER TOOL

(75) Inventors: Wolf Matthias, Stuttgart (DE); Jochen Krauter, Hildrizhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/873,849

(22) Filed: Oct. 17, 2007

(65) Prior Publication Data

US 2008/0102684 A1     May 1, 2008

(30) Foreign Application Priority Data

Oct. 27, 2006   (DE) ........................ 10 2006 050 816

(51) Int. Cl.
*H01R 13/627* (2006.01)
(52) U.S. Cl. ....................... 439/352; 310/50; 173/217
(58) Field of Classification Search ................. 439/345, 439/352, 500, 504, 577; 310/50; 173/217
See application file for complete search history.

(56) References Cited

U.S. PATENT DOCUMENTS 5,368,954 A    11/1994   Bruns

2006/0244318 A1 *  11/2006  Glauning et al. .............. 310/50

FOREIGN PATENT DOCUMENTS

| DE | 10 2004 049 085 | 4/2006 |
|---|---|---|
| GB | 2 436 890 | 10/2007 |
| GB | 2 436 891 | 10/2007 |
| WO | 2006/010676 | 2/2006 |
| WO | 2007/080928 | 7/2007 |

* cited by examiner

*Primary Examiner*—Tho D Ta
(74) *Attorney, Agent, or Firm*—Michael J. Striker

(57) ABSTRACT

An electric hand-held power tool has a machine housing, an energy accumulator module detachably connected therewith and slidable into and out of a guide formed on the machine housing, and a locking device acting between a machine housing and an energy accumulator module and including locking elements, which are located on the machine housing and the energy accumulator module and are engaged with each other in a locked position and may be disengaged manually. To prevent the locking device from becoming released when one of the locking elements designed as a release button is accidentally actuated, the locking device includes a blocking element active in the locked position of the locking elements and blocking manual actuation, wherein the blocking element can be deactivated by manually sliding energy accumulator module in the guide against a return force.

14 Claims, 2 Drawing Sheets

ELECTRIC HAND-HELD POWER TOOL

CROSS-REFERENCE TO A RELATED APPLICATION

The invention described and claimed hereinbelow is also described in German Patent Application DE 10 2006050816.5 filed on Oct. 27, 2006. This German Patent Application, whose subject matter is incorporated here by reference, provides the basis for a claim of priority of invention under 35 U.S.C. 119(a)-(d).

BACKGROUND OF THE INVENTION

The present invention is directed to an electric hand-held power tool.

A known, cordless, hand-guided electric power tool (DE 10 2004 049 085 A1) includes a machine housing, on the lower end—designed as a handle—of which a battery pack or rechargeable battery pack is retained via a releasable locking device. The battery pack is slid via a guide rail into a guide formed in the exposed, lower end of the handle. The motion of inserting the guide rail into the guide is limited via interacting stop surfaces on the rear—as viewed in the direction of insertion—ends of the guide rail and the guide, which bear against each other when the battery pack is located in its locked position and is properly locked in position by the locking device.

The locking device includes a lever arm, which is pivotably supported on the handle, on one end of which a locking component is formed, and on the other end of which an actuating button is formed. In the locked position, the locking component engages—under the force of a locking spring—in a recess formed in the guide rail, in a largely form-fit manner. When inserted into the guide, the battery pack is initially in a front locking position, in which it is locked with the machine housing without any electrical contact with the electrical hand-held power tool, and may then be moved further into a rear locking position, in which it is locked with the machine housing and electrical contact with the electric hand-held power tool is established.

To remove the battery pack, it is released manually by actuating the release button, after which it is removed from the rear locking position. To prevent the battery pack from accidentally moving in the direction for removal past the front locking position and, therefore, to prevent it from sliding out of the guide, the support of the dual-arm lever in the machine housing is designed such that the locking component remains in locked engagement with the battery pack when the battery pack is moved between the two locking positions, and it is movable together with the battery pack relative to the machine housing. After the front locking position is reached, in which the electrical contacting of the electric hand-held power tool has been eliminated, the battery pack may then be released completely by intentionally reactivating the release button, after which it may be removed from the guide.

SUMMARY OF THE INVENTION

Accordingly, it is an object of the present invention to provide an electric hand-held power tool which is a further improvement of the existing hand-held power tools.

In keeping with these objects and with others which will become apparent hereinafter, one feature of the present invention resides, briefly stated, in an electric hand-held power tool, comprising a machine housing; an energy accumulator module which is detachably connected with said machine housing; a guide provided with said machine housing and configured so that said energy accumulator module is slideable into and out of said guide in said machine housing; a locking device acting between said machine housing and said energy accumulator module and including locking elements located on said machine housing and said energy accumulator module and engageable with each other in a locked position and disengageable manually, said locking device including blocking means which are active in the locked position of said locking elements and block manual actuation of said locking elements, said blocking means being deactivatable by manually sliding said energy accumulator module in said guide against a return force.

When the electric hand-held power tool is designed in accordance with the present invention, it has the advantage that, due to the inventive design of the locking device, an accidental actuation of one of the locking elements does not cause the energy accumulator module to be released and drop off of the machine housing. To remove the energy accumulator module, the energy accumulator module must be displaced relative to the machine housing, so that the blocking means become ineffective, and a locking element must be actuated manually while maintaining the displacement position. Only then may the energy accumulator module be pulled out of the guide, which is formed on the machine housing.

The inventive locking device greatly increases the user's safety when handling the electric hand-held power tool, and when working with and carrying the electric hand-held power tool. The inventive locking device is dust-proof, since the intermeshing locking elements need not necessarily be designed to be tight in the form-fit connection. Instead, an amount of play that guarantees dust-resistance may be maintained. The locking device may be realized using cost-favorable production methods, and it enables a modular design to be realized, so that different interfaces between the energy accumulator module and the machine housing may be accommodated when slightly modified designs of the locking device are used.

According to an advantageous embodiment of the present invention, one locking element of the locking device is a locking groove formed on the energy accumlator module, and the other locking element is a spring-loaded locking component located on the machine housing, which plunges into the locking groove in the locked position, and which, to unlock, may be lifted manually out of the locking groove against a spring force. The locking component is formed on the lever arm end of a dual-arm lever pivotably supported in the machine housing, on the other lever arm end of which a release button is located for manually swiveling the lever.

According to an advantageous embodiment of the present invention, the blocking means for blocking the locking component in the locked position include at least one locking bar located on the locking component, and at least one undercut section formed in the locking groove, in which at least one locking bar is engaged when in the locked position. The undercut section of the locking groove is slid off of the locking bar by displacing the energy accumulator module axially against a spring force in the guide of the machine housing, thereby releasing the locking component so it may be withdrawn from the locking groove. If the release button is now pressed, the energy accumulator module is released, so that it may be lifted off of the machine housing.

The novel features of the which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
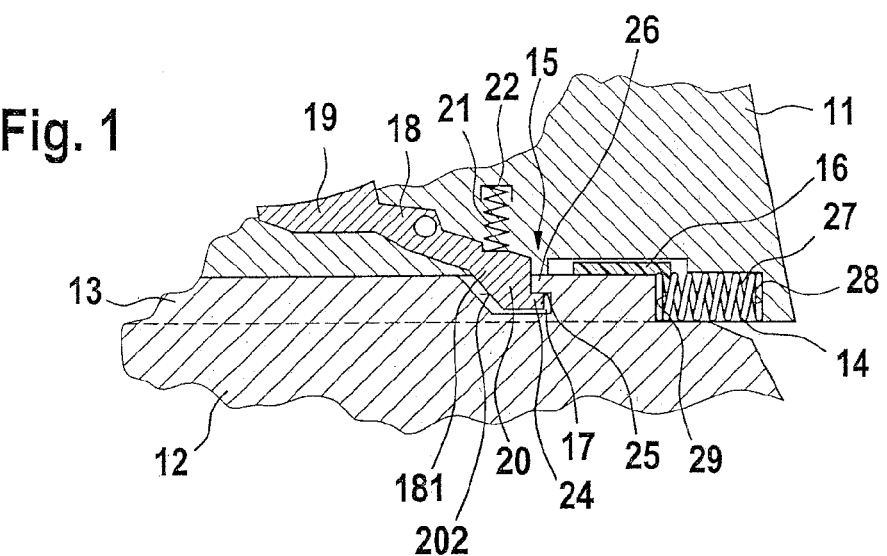
FIG. 1 shows a portion of a longitudinal sectional view of an electric hand-held power tool with an energy accumulator module installed and which may be locked in position using a locking device, in a schematized depiction.

FIG. 1 shows a section of a machine housing 11 and an energy accumulator module 12 in the form of a rechargeable battery pack. The lower end of machine housing 11, which is designed as a handle, and the upper end of energy accumulator module 12, which may be placed on the handle of machine housing 11, are shown. A guide rail 13 is provided on the upper end of energy accumulator module 12, which may be slid into a guide 14 formed on the lower end of machine housing 11 for placement of energy accumulator module 12 on machine housing 11. Energy accumulator module 12, which has been placed on machine housing 11 in this manner, is locked in position reliably using a locking device 15. In the locked position shown in FIG. 1, the not-shown connection contacts of energy accumulator module 12 are contacted with not-shown connection contacts of the electric hand-held power tool, which are located on a contact holder 16 installed in machine housing 11.

Locking device 15 includes a locking groove 17 formed in energy accumulator module 12, and a dual-arm lever 18 pivotably located on machine housing 11, on one lever arm end of which a release button 19 is formed and which is accessible for manual actuation, and on the other lever arm end of which a locking component 20 is formed, which interacts with energy accumulator module 12 for unlocking. Dual-arm lever 18 is loaded by a locking spring 21, which is designed as a compression spring in the exemplary embodiment, and which bears against lever arm 181 with locking component 20, and against a support bearing 22 formed in machine housing 11. In the position in which energy accumulator module 12 is locked on machine housing 11, locking spring 21 presses locking component 20 into locking groove 17, thereby blocking energy accumulator module 12 from being pulled axially out of guide 14.

Figure 2:
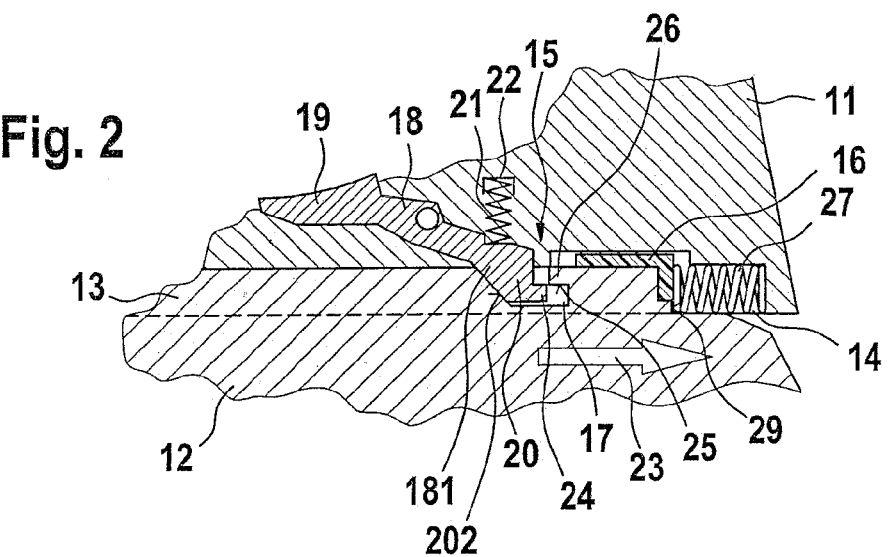
FIG. 2 shows the same depiction in FIG. 1 with an energy accumulator module that has been displaced relative to the electric hand-held power tool.
Figure 3:
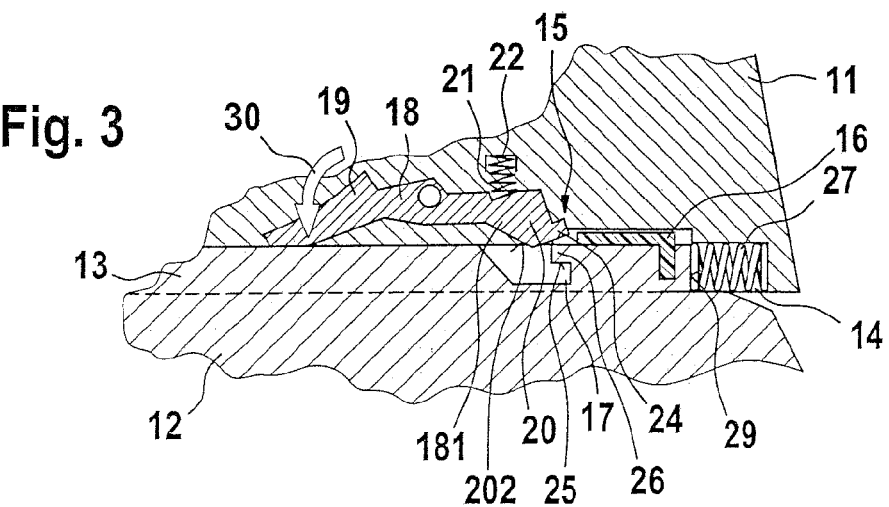
FIG. 3 shows the same depiction as in FIG. 2, with the locking device released.
Figure 4:
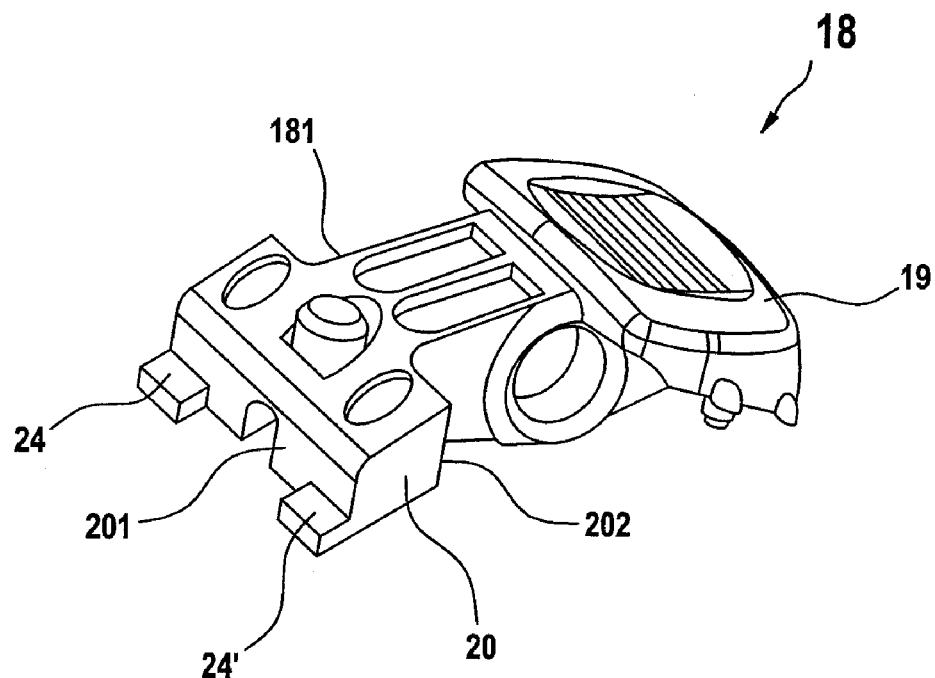
FIG. 4 shows a perspective view of a locking element of the locking device in FIGS. 1 through 3.

To prevent energy accumulator module 12 from becoming released when release button 19 is accidentally actuated, locking device 15 includes blocking means that prevent locking component 20 from being withdrawn from locking groove 17. The blocking means may be deactivated by manually sliding energy accumulator module 12 in guide 14 in insertion direction 23 against a return force. The blocking means include at least one locking bar 24 located on locking component 20, which extends outwardly from end face 201 of locking component 20, which points in insertion direction 23, and at least one undercut section 25 formed in locking groove 17. With dual-arm lever 18 of locking device 15 shown in FIG. 4 in a perspective view, two identical locking bars 24, 24' are provided on locking component 20, which are offset transversely relative to the center line of locking component 20. Correspondingly, two undercut sections 25 are formed in locking groove 17, in which the two locking bars 24, 24' are engaged. As an alternative, one of the two locking bars 24, 24' shown in FIG. 4 may be eliminated, so that only one undercut section 25 is formed in locking groove 17. As shown in FIGS. 1 through 3, each undercut section 25 is formed on a rib 26 integrally formed with energy accumulator module 12. Rib 26 extends into locking groove 17—which is also formed in energy accumulator module 12—against insertion direction 23 of energy accumulator module 12.

In machine housing 11, at the end of guide 14, a return spring 27 designed as a compression spring is positioned such that it is aligned with guide 14. Return spring 27 is guided in contact holder 16 and bears via one end against a support bearing 28 formed on machine housing 11. The end of return spring 27 facing away from support bearing 28 corresponds with a stop shoulder 29 formed on energy accumulator module 12. When energy accumulator module 12 is inserted manually into guide rail 13, stop shoulder 29 of energy accumulator module 12 strikes a lifting bevel 202 formed on locking component 20 and swivels lever 18—while compressing locking spring 21—in the direction of arrow 30 in FIG. 3. When it is displaced further, stop shoulder 29 bears against return spring 27 and tensions it.

When energy accumulator module 12 is slid slightly past its end position, locking component 20—with locking bar 24 located thereon—drops into locking groove 17 due to the effect of locking spring 21. When energy accumulator module 12 is released, return spring 27 pushes energy accumulator module 12 backward slightly against insertion direction 23, and rib 26—with undercut section 25—glides over locking bar 24, and simultaneously presses lifting bevel 202 of locking component 20 on the front—as viewed in insertion direction 23—flank. Dual-arm lever 18 is therefore blocked, and it may not be swiveled, even when release button 19 is pressed. This locked position and the end position of energy accumulator module 12 on machine housing 11 are illustrated schematically in FIG. 1.

To remove energy accumulator module 12 from machine housing 11, energy accumulator module 12 must first be displaced in insertion direction 23 against the return force of return spring 27, until rib 26 is pulled away from locking bar 24 on locking component 20 (FIG. 2). When the displacement position of energy accumulator module 12 is maintained, locking component 20 may then be lifted out of locking groove 17 by actuating release button 19 in the direction of arrow 20 in FIG. 3, thereby releasing energy accumulator module 12 from machine housing 11 (FIG. 3). Energy accumulator module 12 may now be pulled out of guide 14.

If, when working with or carrying the electric hand-held power tool, energy accumulator module 12 is accidentally displaced axially in insertion direction 23 without release button 19 having been actuated, and the displacement force is then eliminated, return spring 27 pushes rib 26 over locking bar 24 on locking component 20 again, and energy accumulator module 12 remains locked in position. Locking device 15 may therefore not be released even when energy accumulator module 12 is accidentally displaced. To release locking device 15, energy accumulator module 12 must be displaced while simultaneously pressing release button 19 down, in the direction of arrow 30.

Figure 5:
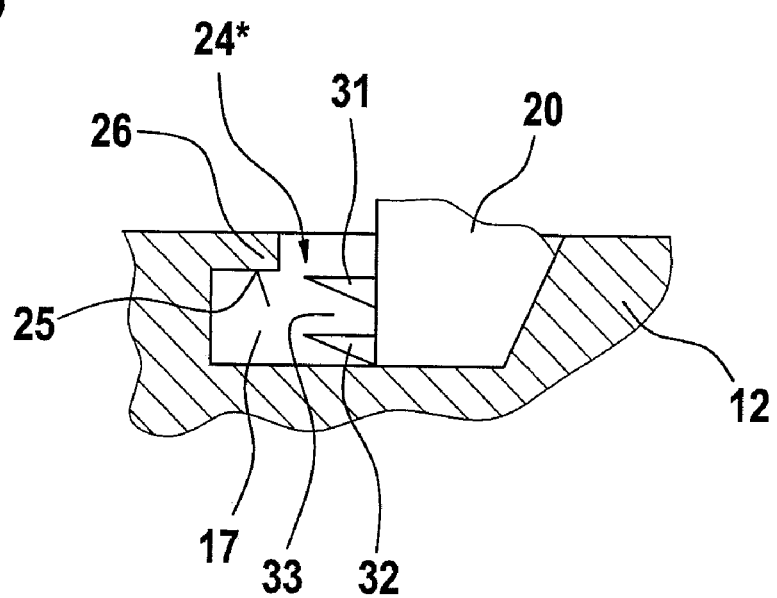
FIG. 5 shows a section of a side view of a modified locking element of the locking device, in a schematized depiction.

Locking bar 24 or 24' (FIG. 4) formed on locking component 20 may also have a non-cuboid design. Locking bar 24* shown in the exemplary embodiment in FIG. 5 is designed as a toothed strip with two teeth 31, 32 located one over the other, between which a tooth gap 33 is present. Tooth gap 33 is high enough that rib 26 on energy accumulator module 12 may plunge at least partially into tooth gap 33. Teeth 31, 32 include upper tooth flanks, which are oriented parallel to undercut section 25 on rib 26. When energy accumulator module 12 is slid into the locked position (FIG. 1), undercut section 25 on rib 26 glides over the upper flank of upper tooth 31.

Lower tooth 32 performs additional securing functions for the case when energy accumulator module 12 has been accidentally displaced in insertion direction 23 and is returned via the action of return spring 27 to the locked position without release button 19 having been pressed. If, when energy accumulator module 12 returns to the locked position, dual-arm level 18 is pivoted slightly, for whatever reason, and locking component 20 is therefore lifted slightly in locking groove 17, locking bar 24* does not prevent locking component 20 from being blocked again, since rib 26 may plunge into tooth gap 33 and glide over the upper flank of lower tooth 32 to block locking component 20 once more.

It will be understood that each of the elements described above, or two or more together, may also find a useful application in other types of constructions differing from the type described above.

While the invention has been illustrated and described as embodied in an electric hand-held power tool, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

The invention claimed is:

1. An electric hand-held power tool, comprising a machine housing; an energy accumulator module which is detachably connected with said machine housing; a guide provided with said machine housing and configured so that said energy accumulator module is slidable into and out of said guide in said machine housing; a locking device acting between said machine housing and said energy accumulator module and including locking elements located on said machine housing and said energy accumulator module and engageable with each other in a locked position and disengageable manually, said locking device including blocking means which are active in the locked position of said locking elements and block manual actuation of said locking elements, said blocking means being deactivatable by manually sliding said energy accumulator module in said guide against a return force.

2. An electric hand-held power tool as defined in claim 1, wherein said locking elements of said locking device include one locking element configured as a locking groove which is formed on said energy accumulator module, and another locking element configured as a spring-loaded locking component located on said machine housing and plunging into said locking groove in the locked position, said spring-loaded locking component being liftable manually out of said locking groove against a spring force.

3. An electric hand-held power tool as defined in claim 2, wherein said spring-loaded locking component is formed on a lever arm end of a dual-arm lever pivotally supported in said machine housing, on another end of which a release button is located for manually swiveling the lever.

4. An electric hand-held power tool as defined in claim 2, wherein said locking device includes a locking spring which bears against a lever arm of a lever with said spring loaded locking component and against a support bearing formed in said machine housing.

5. An electric hand-held power tool as defined in claim 2, wherein said locking means include at least one locking bar located on said spring-loaded locking component and at least one undercut section formed in said locking groove in which said at least one locking bar is engaged when in the locked position.

6. An electric hand-held power tool as defined in claim 5, wherein said at least one locking bar is located such that it is offset transversely relative to a center of said spring-loaded locking component.

7. An electric hand-held power tool as defined in claim 5, wherein said locking means include a second locking bar located on said spring-loaded locking component, and a second undercut section formed in said locking groove so that said two locking bars correspond to said two undercut sections.

8. An electric hand-held power tool as defined in claim 5, wherein said undercut section is formed on a rib which extends into said locking groove against a direction of insertion of said energy accumulator module and which is slid in the locked position via a spring force directed against a direction of insertion and acting on said energy accumulator module over said at least one locking bar.

9. An electric hand-held power tool as defined in claim 8, wherein said locking bar includes at least one flat surface extending parallel to said undercut section, which in the locked position bears against an underside of said rib.

10. An electric hand-held power tool as defined in claim 1; and further comprising a return spring which provides a spring force acting on said machine housing and said energy accumulator module.

11. An electric hand-held power tool as defined in claim 10, wherein said return spring is configured as a compression spring which acts on said machine housing and said energy accumulator module.

12. An electric hand-held power tool as defined in claim 11; and further comprising a contact holder provided with electrical connection contacts and attached to said machine housing, said return spring being guided on said contact holder.

13. An electric hand-held power tool as defined in claim 6, wherein said locking bar includes at least two teeth located one over the other with a tooth space therebetween and dimensioned such that said rib can plunge at least partially into said tooth space.

14. An electric hand-held power tool as defined in claim 1, wherein said energy accumulator module is configured as a rechargeable battery pack.

\* \* \* \* \*